United States Patent
Wang et al.

(10) Patent No.: US 11,693,465 B2
(45) Date of Patent: Jul. 4, 2023

(54) METHOD AND APPARATUS FOR DATA SCRAMBLING

(71) Applicants: ADVANCED MICRO DEVICES INC., Santa Clara, CA (US); ATI TECHNOLOGIES ULC, Markham (CA)

(72) Inventors: Yanfeng Wang, Markham (CA); Michael J. Tresidder, Austin, TX (US); Kevin M. Lepak, Austin, TX (US); Larry David Hewitt, Austin, TX (US); Noah Beck, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 7 days.

(21) Appl. No.: 17/150,600

(22) Filed: Jan. 15, 2021

(65) Prior Publication Data
US 2021/0132675 A1 May 6, 2021

Related U.S. Application Data

(63) Continuation of application No. 16/586,817, filed on Sep. 27, 2019, now Pat. No. 10,895,901.

(51) Int. Cl.
*G06F 1/32* (2019.01)
(52) U.S. Cl.
CPC .................................... *G06F 1/32* (2013.01)
(58) Field of Classification Search
CPC .................................................. G06F 13/426
See application file for complete search history.

(56) References Cited

U.S. PATENT DOCUMENTS

| | | | |
|---|---|---|---|
| 5,530,959 A | 6/1996 | Amrany | |
| 8,634,312 B2 * | 1/2014 | Chun | H04L 69/22 370/255 |
| 8,949,493 B1 | 2/2015 | Iman | |
| 9,251,036 B2 | 2/2016 | Christiansen | |
| 10,860,449 B2 * | 12/2020 | Sharma | G06F 11/3006 |
| 2002/0015494 A1 | 2/2002 | Nagai | |
| 2011/0051934 A1 | 3/2011 | Ikeda | |
| 2014/0362990 A1 * | 12/2014 | Kim | H04L 25/03872 380/268 |
| 2019/0020511 A1 * | 1/2019 | Pillai | H04B 3/04 |

* cited by examiner

*Primary Examiner* — Henry Tsai
*Assistant Examiner* — Juanito C Borromeo
(74) *Attorney, Agent, or Firm* — Volpe Koenig

(57) ABSTRACT

A method and apparatus for scrambling and descrambling data in a computer system includes transmitting non-scrambled data from a first high speed inter chip (IP) link circuit located on a first chip to a first serializer/deserializer (SERDES) physical (PHY) circuit located on the first chip, the first high speed link IP indicating the data is not scrambled. The received non-scrambled data is scrambled by the first SERDES PHY circuit and transmitted to a second chip. The received scrambled data is descrambled by a second SERDES PHY circuit located on the second chip. The non-scrambled data is transmitted by the second SERDES PHY circuit to a second high speed link IP circuit located on the second chip to a third circuit for further processing or transmission.

8 Claims, 4 Drawing Sheets

METHOD AND APPARATUS FOR DATA SCRAMBLING

CROSS REFERENCE TO RELATED APPLICATION

This application is a continuation of U.S. patent application Ser. No. 16/586,817, filed Sep. 27, 2019, which is incorporated by reference as if fully set forth.

BACKGROUND

A high speed serial link often requires scrambled data be transmitted. In a typical high speed serial link IP, public protocols do not necessarily support a method of having data scrambled or descrambled near a serializer/deserializer (SERDES) input/output port. Since future application specific integrated circuit (ASIC) applications may require significantly more chiplet interconnections, scrambling data may cause an undesirable increase in power consumption.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a mechanism for transmitting data and enabling scrambling and descrambling of the data is described herein.

The mechanism utilizes the addition of a non-scrambled header/pattern followed by execution of a scrambler/descrambler linear feedback shift register (LFSR), which can be used at any point on the data transmission path to turn data scrambling and descrambling on and off. Scrambled data is compared at each point along the way to a destination module. Using non-scrambled data where possible may result in power savings and allow clock gating to be more readily implemented, which also achieves power savings.

A method for scrambling and descrambling data in a computer system includes transmitting data from a first high speed inter chip (IP) link circuit located on a first chip to a first serializer/deserializer (SERDES) physical (PHY) circuit located on the first chip. The first high speed link IP indicates whether the data is scrambled. On a condition that the data is non-scrambled, the first SERDES PHY scrambles the received non-scrambled data and transmits the scrambled data to a second chip. The scrambled data is received by a second SERDES PHY circuit located on the second chip, which descrambles the scrambled data, and transmits the non-scrambled data to a third circuit for further processing or transmission.

An apparatus for scrambling and descrambling data in a computer system includes a first chip and a second chip. The first chip includes a first high speed inter chip (IP) link circuit, and a first serializer/deserializer (SERDES) physical (PHY) circuit, communicatively coupled with the first high speed link IP circuit. The second chip includes a second SERDES PHY circuit. The first high speed link IP circuit transmits data to the first SERDES PHY circuit located on the first chip, indicating whether the data is scrambled. On a condition that the data is non-scrambled, the first SERDES PHY scrambles the received non-scrambled data and transmits the scrambled data to the second chip. The second SERDES PHY circuit located on the second chip receives the scrambled data, descrambles the scrambled data, and transmits the non-scrambled data to a third circuit for further processing or transmission.

Figure 1:
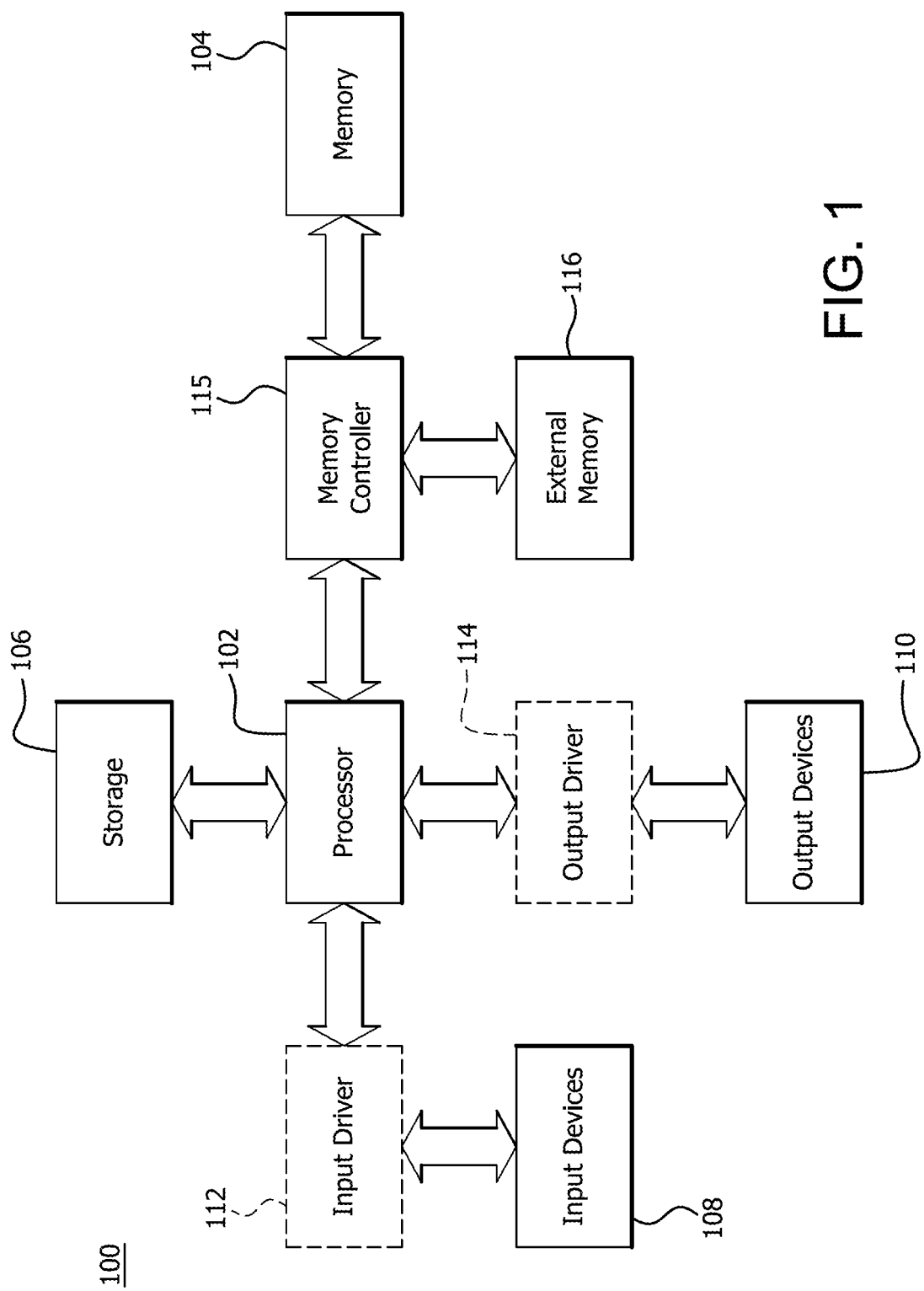
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. Additionally, the device 100 includes a memory controller 115 that communicates with the processor 102 and the memory 104, and also can communicate with an external memory 116. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

The external memory 116 may be similar to the memory 104, and may reside in the form of off-chip memory. Additionally, the external memory may be memory resident in a server where the memory controller 115 communicates over a network interface to access the memory 116.

Figure 2:
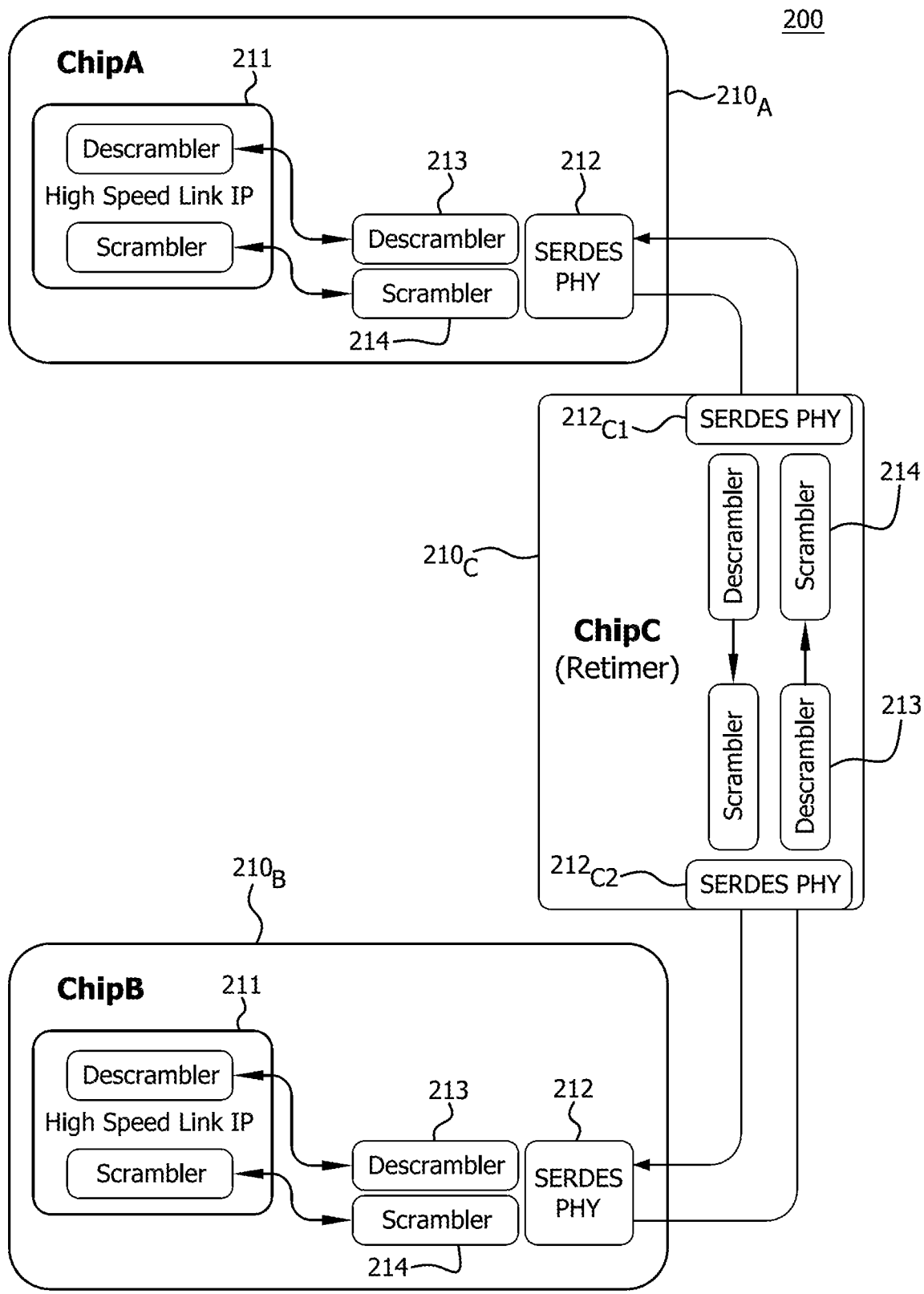
FIG. 2 is a schematic diagram of an example circuit depicting a data transmission between chips.

FIG. 2 is a schematic diagram of an example circuit 200 depicting a data transmission between chips 210. In the example shown in FIG. 2, three chips 210 (designated ChipA $210_A$, Chip B $210_B$, and ChipC $210_C$) are in communication with one another. ChipA and ChipB each include a high speed interchip (IP) link circuitry 211 and a SERDES physical (PHY) link circuitry 212. The high speed link IP 211 transmits data to the SERDES PHY circuitry 212 for transmission to another chip, and receives data from the SERDES PHY circuitry 212 from other chips.

For example, in FIG. 2, the high speed link IP 211 in ChipA sends data to the SERDES PHY circuitry 212 in ChipA, which is transmitted to ChipB. Where distances are great between ChipA and ChipB, for example, the use of a re-timer Chip, (e.g., ChipC), may be required to receive the transmission from ChipA and transmit the data along to ChipB. ChipC includes a SERDES PHY circuitry 212 for transmitting and receiving data from ChipA and a SERDES PHY circuitry 212 for transmitting and receiving data from ChipB.

Also included in ChipA, ChipB and ChipC are descramblers 213 and scramblers 214. The scramblers 214 scramble data with a scrambling code for transmission and the descramblers 213 descramble received scrambled data. For example, in ChipA and ChipB, a scrambler and descrambler resides in both the high speed link IP 211 and the SERDES PHY circuitry 212 of each chip 210.

In ChipC, which is a re-timer chip, each SERDES PHY circuitry 212 includes a descrambler 213 and a scrambler 214. Each SERDES PHY circuitry 212 also includes transmitter circuits and receiver circuits which communicate over a plurality of transmission lanes. The chips 210 (e.g., ChipA, ChipB, and ChipC) may reside in the processor 101 of FIG. 1. Alternately, the chips 210 may reside in different processors. For example, ChipA may reside in processor 101 while ChipB or Chip C resides in a separate processor. Power saving may be realized by performing scrambling in the scrambler 214 residing at the SERDES PHY circuitry 212 in ChipA or ChipB rather than scrambling in the scrambler 214 residing in the respective high speed link IP 211. Accordingly, as shown in FIG. 2, the scrambling functionality in ChipA is moved from being performed by the scrambler 214 in the high speed link IP 211 to the scrambler 214 in the SERDES PHY circuitry 212. The descrambling functionality is moved from being performed at the descrambler 213 located in the high speed link IP 211 to the descrambler 213 located in the SERDES PHY circuitry 212 of ChipA.

Similarly, the scrambling functionality in ChipB is moved from being performed by the scrambler 214 in the high speed link IP 211 to the scrambler 214 in the SERDES PHY circuitry 212. The descrambling functionality is moved from being performed at the descrambler 213 located in the high speed link IP 211 to the descrambler 213 located in the SERDES PHY circuitry 212 of ChipB.

As discussed above, since the physical distances between ChipA and ChipB may be long, the use of a re-timer chip (e.g., ChipC) may be necessary to completely transmit data between ChipA and ChipB. Accordingly, Chip C includes descramblers 213 and scramblers 214 in the SERDES PHYs circuitry 212, allowing the sending of non-scrambled data inside of the re-timer. In order to provide information as to whether or not data scrambling is turned on or off during transmission from the high speed link IP 211 in ChipA and ChipB, a header pattern may be utilized.

In the arrangement shown above, power savings may be achieved by using non-scrambled data transmission where possible as well as providing for clock gating to be implemented more readily.

Figure 3:
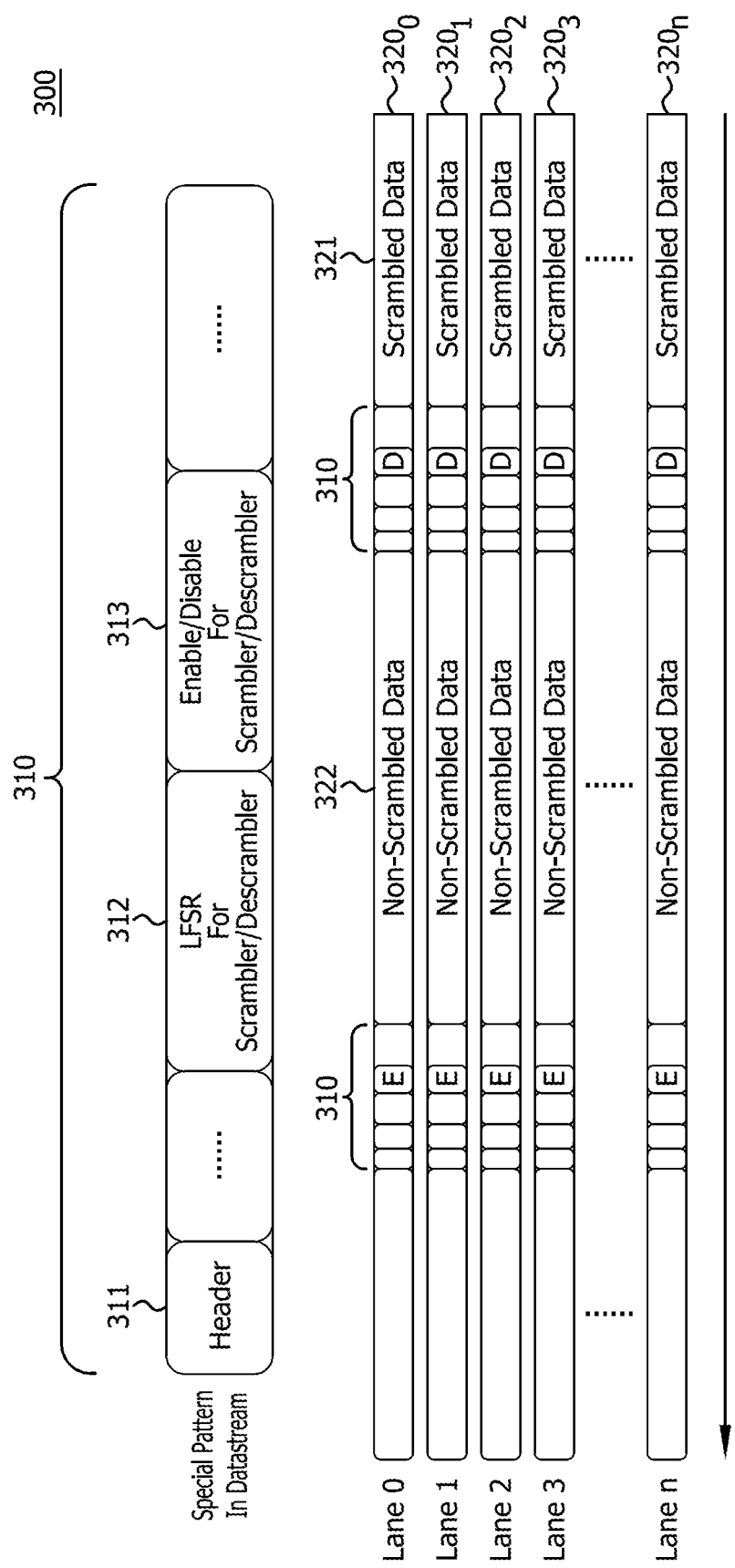
FIG. 3 is a diagram of a data transmission on data lanes that include a header, according to an example.

FIG. 3 is a diagram of a data transmission on data lanes 300 that include a pattern 310, according to an example. As discussed above, downstream receivers of the data are informed whether or not the data is scrambled. Accordingly, the pattern 310 includes a header 311 followed by a symbol indicating scrambling on or off. For example, the pattern 310 includes an LFSR field 312 for the scrambler/descrambler and an enable/disable bit 313 for the scrambler/descrambler.

The data is transmitted along data lanes 320 0-$n$ (designated $320_0$, $320_1$, $320_2$, $320_3$, . . . , $320_n$). The data transmitted on each data lane 320 includes the pattern 310, scrambled data 321 and non-scrambled data 322. The pattern 310 is inserted periodically or randomly in the data stream.

A downstream scrambler/descrambler monitors the LFSR field 312 and enable/disable bit 313 in the pattern 310. The upstream scrambler/descrambler can decide to start/stop scrambling/descrambling data and setting the enable/disable bit 313 in the pattern 310 accordingly. The LFSR is from the transmitter of the high speed link IP 211, and remains without change on its way to the destination—the receiver of the high speed link IP 211 on other side of the highspeed link.

All scramblers/descramblers on the way of data transmitting are armed by the LFSR in the pattern 310. If the data is not scrambled in the high speed link IP 211, it is scrambled by the scrambler proximate to the SERDES PHY circuitry 212. If the data has not been descrambled by the descrambler proximate to the SERDES PHY circuitry 212, it is descrambled by the descrambler in the high speed link IP 211. The enable/disable bit 313 in the pattern 310 is used to coordinate these scramblers/descramblers.

Referring back to FIG. 2, data to be transmitted by the high speed link IP 211 of ChipA may be transmitted non-scrambled to the SERDES PHY circuitry 212 of ChipA. Accordingly, the data transmission 320 includes the pattern 310 with the enable/disable bit 313 set to "enable" (E), with non-scrambled data 322 following. Accordingly, the SERDES PHY circuitry 212 receives the data 322, reads the pattern 310 to acquire the LFSR, scrambles the data at scrambler 214, and clears the bit to the "disable" (D) setting, prior to transmission.

In the example shown in FIG. 2, the data is received at the SERDES PHY circuitry $212_{c1}$ of Chip C where the pattern 310 is read, the descrambler 213 may receive the LFSR from the pattern 310 and start to descramble the scrambled data, and set the enable/disable bit 313 to E. When the other side of ChipC receives non-scrambled data 322 and reads the pattern 310 to determine the data has been descrambled, it clears the enable/disable bit 313 in the pattern 310, and scrambles the data before it passes it to the SERDES PHY circuitry $212_{c2}$.

The SERDES PHY 212 of ChipA receives the scrambled data and reads the pattern 310 for the LFSR. The descrambler 213 starts to descramble the data, sets the enable/disable bit 313 in the header pattern 310 to E, and transmits the data to the high speed link IP 211 in ChipA. At this time, the high speed link IP 211 doesn't need to descramble the received data because it reads the pattern 310, determines the data has been already descrambled by the descrambler proximate to the SERDES PHY 212. It should be noted that the SERDES PHY 212 only accepts scrambled data. That is, non-scrambled data is scrambled prior to being received by the SERDES PHY 212.

The above process for transmitting data is repeated along all of lanes 0-$n$ depicted in FIG. 3. Further, the same process is utilized for transmitting data from ChipA to ChipB. In such a manner, power savings may be achieved by having the non-scrambled data transmitted from the high speed link IPs 211 descrambled to the SERDES PHY 212 of the respective Chip 210.

Figure 4:
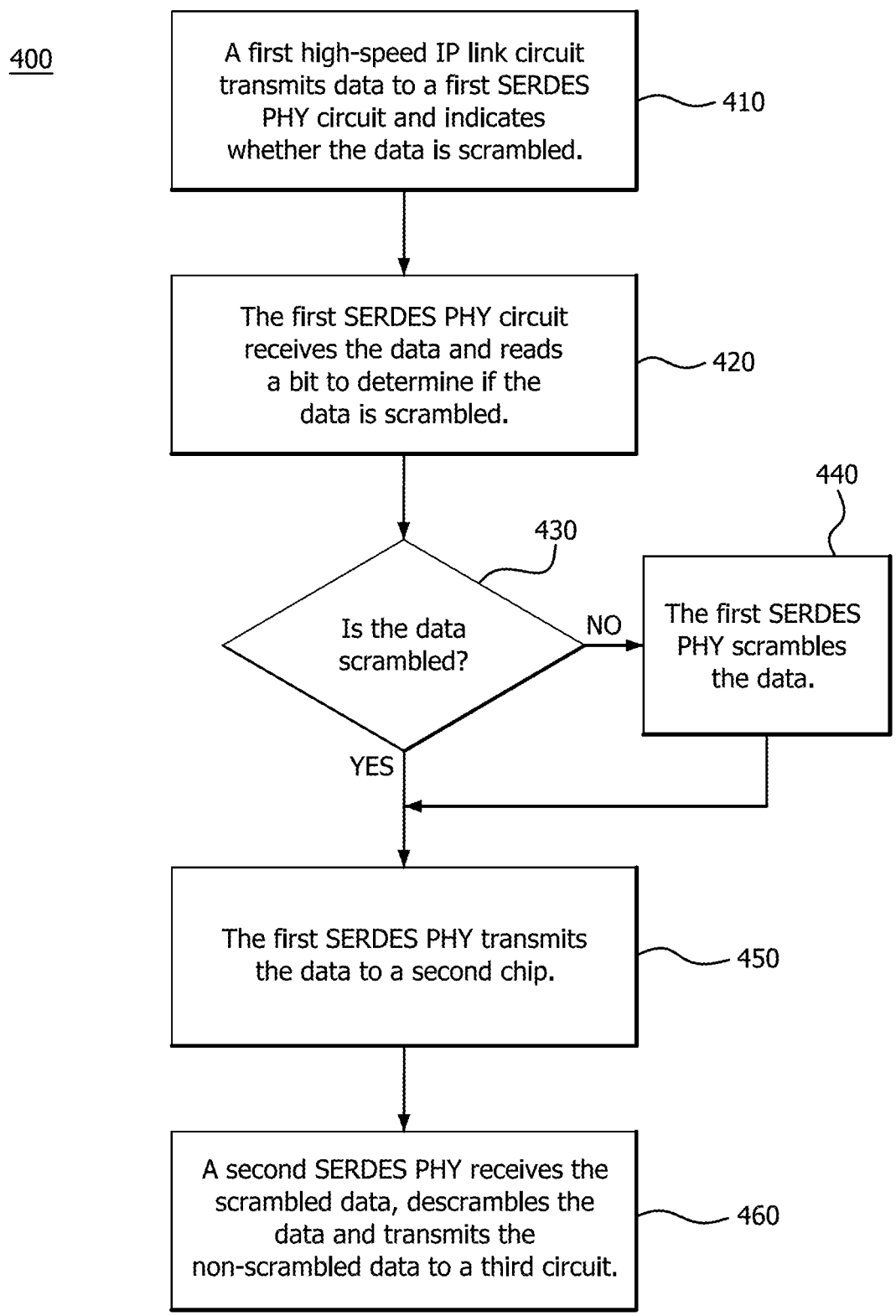
FIG. 4 is a flow diagram of an example method of data scrambling.

FIG. 4 is a flow diagram of an example method 400 of data scrambling. The method described below in FIG. 4 is described with reference to FIGS. 2 and 3 above but can be implemented in other devices as mentioned further below.

In step 410, a first high speed IP link circuit transmits data to a first SERDES PHY circuit. For example, high speed link 211 of ChipB transmits data to SERDES PHY 212 of ChipB. The first high speed IP link circuit also indicates whether the data is scrambled. For example, using the pattern 310, high speed link 211 of ChipB indicates to SERDES PHY 212 of ChipB whether the data is scrambled or not by setting the enable/disable bit 313.

The first SERDES PHY circuit receives the data and reads a bit to determine if the data is scrambled (step 420). For example, referring back again to FIGS. 2 and 3, SERDES PHY 212 of ChipB reads the enable/disable bit 313 to determine whether or not the data is scrambled.

If the data is not scrambled (step 430), then the first SERDES PHY scrambles the data in step 440. For example, if the SERDES PHY 212 of ChipB reads the enable/disable bit 313 of the pattern 310, and it is indicated that the data is not scrambled, the SERDES PHY 212 of ChipB scrambles the data and sets the enable/disable bit 313 of the pattern 310 to indicate the data is scrambled.

If the data is scrambled in step 430, or if the SERDES PHY scrambles the data in step 440, the method proceeds to step 450, where the first SERDES PHY transmits the data to a second chip. For example, SERDES PHY 212 of ChipB transmits the scrambled data to the retimer Chip (Chip C), or if there is no retimer Chip, directly to ChipA.

A second SERDES PHY (e.g., SERDES PHY 212 of ChipC or SERDES PHY 212 of ChipB) receives the scrambled data, descrambles the data, and transmits the non-scrambled data to a third circuit (step 460). In the case of the second SERDES PHY being the SERDES PHY 212 of Chip C, it transmits the non-scrambled data to the scrambler 214 associated with the SERDES PHY 212 for scrambling and retransmission to ChipA. In the case of the second SERDES PHY being the SERDES PHY 212 of ChipA, it transmits the non-scrambled data to the high speed link IP circuit 211 of Chip A.

The methods provided can be implemented in a general purpose computer, a processor, or a processor core. Suitable processors include, by way of example, a general purpose processor, a purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure. Further, although the methods and apparatus described above are described in the context of controlling and configuring PCIe links and ports, the methods and apparatus may be utilized in any interconnect protocol where link width is negotiated.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). For example, the methods described above may be implemented in the processor 102 or on any other processor in the computer system 100.

What is claimed is:

1. A method for scrambling and descrambling data in a computer system, comprising:
   receiving data and an indication of whether the data is scrambled by a first serializer/deserializer (SERDES) physical (PHY) circuit located on a first chip;
   descrambling, by the first SERDES PHY, the data to form non-scrambled data when the indication indicates the data is scrambled; and
   transmitting, by the first SERDES PHY, the non-scrambled data and an indication that the data is non-scrambled to a second circuit for further processing or transmission.

2. The method of claim 1, wherein the first SERDES PHY transmits the non-scrambled data to a high speed inter chip (IP) link circuit located on the first chip.

3. The method of claim 1, wherein the first SERDES PHY transmits the non-scrambled data to a second SERDES PHY located on the first chip.

4. The method of claim 3, wherein the second SERDES PHY on the first chip scrambles the data and transmits the scrambled data to a third SERDES PHY on a second chip.

5. An apparatus for scrambling and descrambling data in a computer system, comprising:
   a first chip including:
      a first serializer/deserializer (SERDES) physical (PHY) circuit on the first chip; and
      a second circuit communicatively coupled with the first SERDES PHY,
      wherein the first SERDES PHY receives data and an indication of whether the data is scrambled, descrambles the data to form non-scrambled data when the indication indicates the data is scrambled, and transmits the non-scrambled data and an indication that the data is non-scrambled to the second circuit for further processing or transmission.

6. The apparatus of claim 5, wherein the first SERDES PHY transmits the non-scrambled data to a high speed inter chip (IP) link circuit located on the first chip.

7. The apparatus of claim 5, wherein the first SERDES PHY transmits the non-scrambled data to a second SERDES PHY located on the first chip.

8. The apparatus of claim 7, wherein the second SERDES PHY on the first chip scrambles the data and transmits the scrambled data to a third SERDES PHY on a second chip.

* * * * *